United States Patent [19]

Shefflin

[11] Patent Number: 5,507,543
[45] Date of Patent: Apr. 16, 1996

[54] REUSABLE CONTAINER FOR CARRYING BABY FEEDING PRODUCTS

[76] Inventor: Joanne Shefflin, 850 Highland Ave., Piedmont, Calif. 94611

[21] Appl. No.: 334,649

[22] Filed: Nov. 9, 1994

Related U.S. Application Data

[63] Continuation-in-part of Ser. No. 268,068, Jun. 28, 1994, which is a continuation of Ser. No. 9,158, Jan. 26, 1993, abandoned.

[51] Int. Cl.$^6$ .............................. A45F 5/00; B65D 25/28
[52] U.S. Cl. .......................... 294/146; 294/159; 206/427; 220/763
[58] Field of Search .............................. 294/31.2, 32, 33, 294/146, 148, 159, 160, 162, 163, 165, 87.2; 206/427, 428, 459.5, 203; 220/509, 513, 515, 762–764

[56] References Cited

U.S. PATENT DOCUMENTS

| | | |
|---|---|---|
| 1,220,975 | 3/1917 | Gemeinder et al. ................ 220/763 X |
| 1,520,444 | 12/1924 | Romadka . |
| 1,990,675 | 2/1935 | Sinz et al. . |
| 2,414,708 | 1/1947 | Bassichis ............................ 220/763 X |
| 2,900,105 | 8/1959 | Rucker ................................ 220/509 X |
| 3,219,233 | 11/1965 | Whiteford .............................. 206/203 |
| 3,341,053 | 9/1967 | Keene . |
| 3,349,958 | 10/1967 | Breneman . |
| 3,842,976 | 10/1974 | Dea ...................................... 206/203 |
| 3,891,084 | 6/1975 | Elizondo-Garcia ................ 294/159 X |
| 3,910,472 | 10/1975 | Russo . |
| 3,951,259 | 4/1976 | Oglesbee .......................... 206/427 X |
| 3,991,879 | 11/1976 | Hirota ..................................... 206/203 |
| 4,067,474 | 1/1978 | Prodel . |
| 4,326,629 | 4/1982 | Tate ...................................... 206/427 X |
| 4,538,727 | 9/1985 | Solloway . |
| 4,721,237 | 1/1988 | Leslie ................................. 206/428 X |
| 4,986,416 | 1/1991 | Arthurs .............................. 206/427 X |

FOREIGN PATENT DOCUMENTS

| | | | |
|---|---|---|---|
| 1100957 | 9/1955 | France .................................. 294/159 |
| 1139342 | 5/1989 | Japan .................................... 220/763 |
| 373716 | 6/1932 | United Kingdom ................... 294/159 |

*Primary Examiner*—Dean Kramer
*Attorney, Agent, or Firm*—Townsend and Townsend and Crew

[57] ABSTRACT

A reusable, self-contained, multiple-cavity carrying container for transporting a number of baby bottles, nursers and/or jars of baby food from one location to another. The container has a basic basket-like shape with an adjustable, removable handle. The container at each cavity has a clamp-like holder with a diameter approximately the size of the smallest diameter of the conventional baby bottle currently on the market. The holder is yieldable and has an open space that vertically extends throughout the height of the container. This allows the holder to expand and contract to accommodate bottles of different sizes. The holder grips the bottle or a pair of baby food jars by self-adjusting to the diameter of the bottle or jar placed in the holder. Then, with friction lightly gripping the sides of the bottle or jar, the holder keeps the bottle or jar from falling out of the holder if the container were to tip over on its side. However, with a small pulling force, the bottle or jar will be easily removed from the holder. The container also has an adjustable handle that can be moved from a high position to make room for taller bottles and can also be snapped down to a lower height for compact storage places and for compact packaging and shipping.

20 Claims, 10 Drawing Sheets

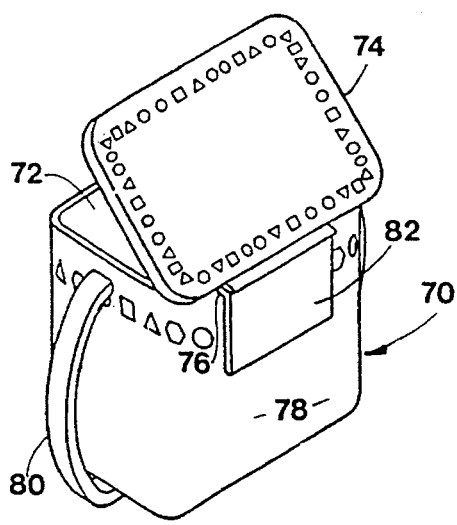
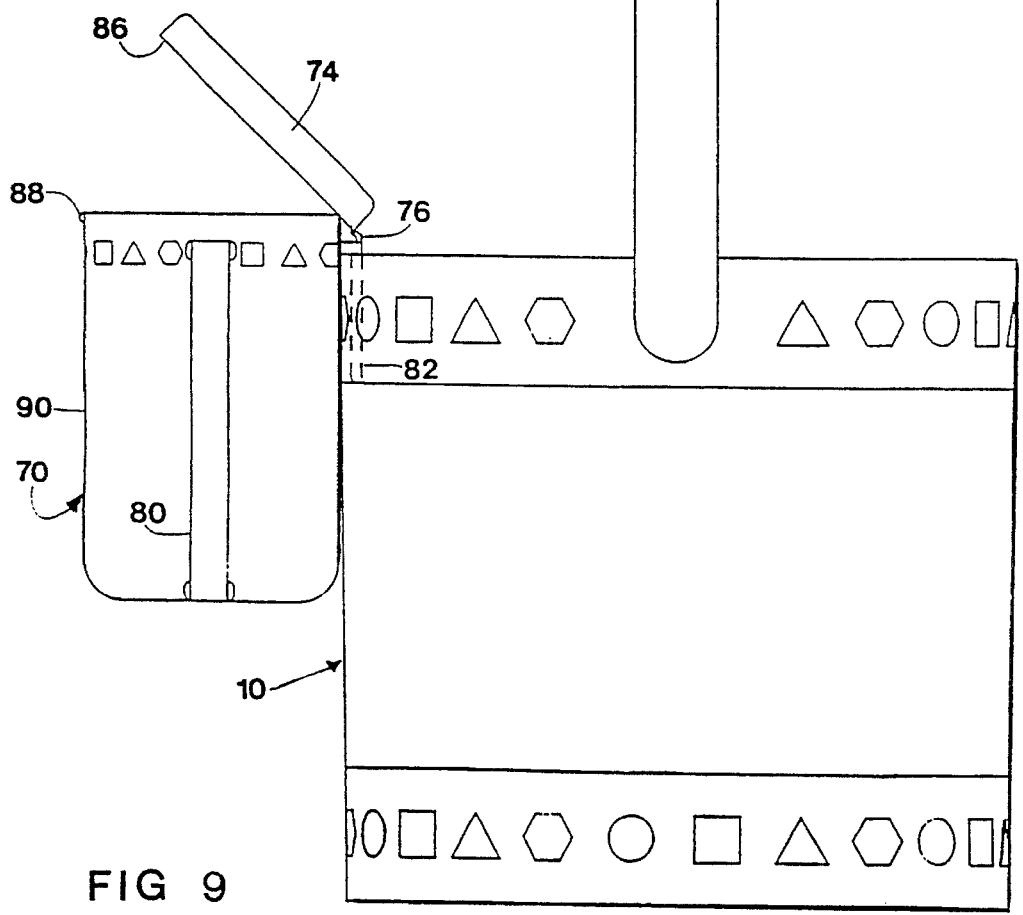
FIG 10
FIG 9

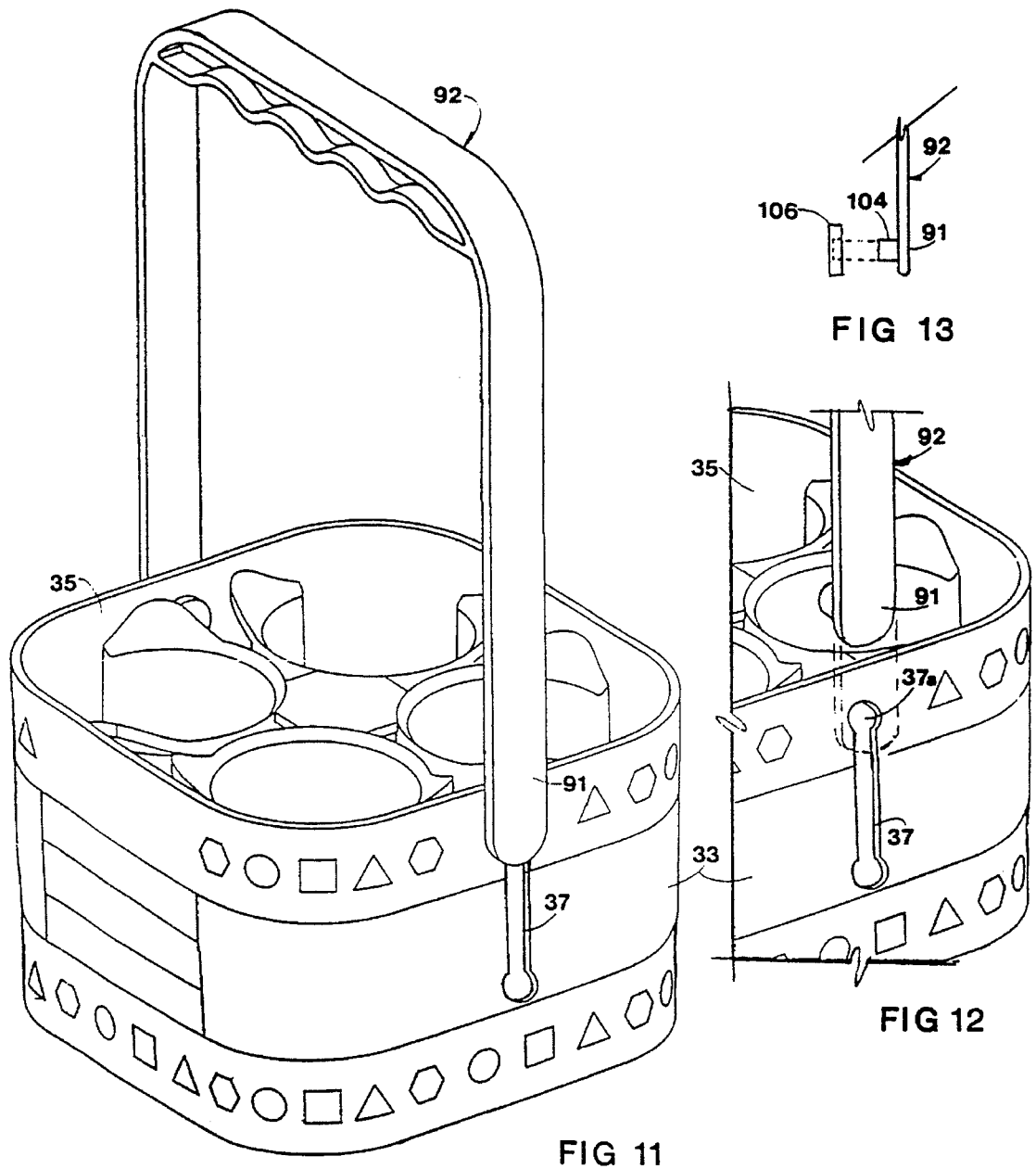

REUSABLE CONTAINER FOR CARRYING BABY FEEDING PRODUCTS

This is a continuation in part application of application Ser. No. 08/268,068, filed Jun. 28, 1994, which was a file wrapper continuation of application Ser. No. 08/009,158, filed Jan. 26, 1993, now abandoned.

This invention relates to open top containers for carrying cylindrical vessels of all types, including baby bottles, baby food jars, juice cups, and related feeding products of similar shapes and, more particularly, to an open top carrier unit for snugly receiving and carrying such products. The container is also designed to carry accessory pieces that clip on the side of the container, such as smaller reusable plastic containers for the purpose of holding dried food stuffs and/or juice boxes.

BACKGROUND OF THE INVENTION

Currently, there is no reusable container specifically designed to carry baby bottles (or nursers), juice cups or jars of pureed baby food in multiple cavities adapted specifically for receiving such baby bottles or food jars. All baby bottles that are sold in multiples are sold in non-reusable paper or plastic packages. This approach creates waste in the environment. Both hard and flexible plastics and paper products are used for the sole purpose of packaging several bottles to be sold together. After the bottles have been unpackaged, the packaging material is thrown away and bottles are used in the normal fashion.

In addition, it can be a cumbersome task for the caretaker of a baby to travel even a short distance with the child's daily paraphernalia, i.e., baby bottles, juice cups, jars of baby food, dried foods such as cereals, etc. The conventional way of carrying these items is to place them loosely into large diaper bags or into large, multi-use carrying bags, with any other items for the child's daily use. This makes for a frustrating task of fishing out each item from a bag with many other items in the bag.

Now more new mothers than ever before are returning to the work place soon after their baby's birth. As a result, such mothers are taking their babies to day care centers outside the home, to a babysitter's home or to the day care center in their workplace. They also travel with their babies at early ages, whether on business or pleasure trips.

The inconvenience of loose bottles and jars of baby food floating around the diaper bag and then fishing them out individually and handing them out to the day care person can be an awkward situation. Moreover, it may take several trips to place them all in a refrigerator unit for the baby's use during that day.

Because of the foregoing drawbacks, a need exists for a reusable container for the specific purpose of transporting multiple containers of baby food, i.e., baby bottles, juice cups and jars of baby food, from the home to any given destination where the baby may be for a long enough time such that the child will need to be fed from several bottles and/or from a number of jars of baby food.

In addition, with many loose bottles and food jars arriving at day care centers at approximately the same time each day as many children are dropped off by parents on their way to work, there is much confusion as to which bottle or jar belongs to which child. A container is, therefore, needed which not only keeps each bottle and jar of one child neatly contained in an individual compartment separate from the bottles and jars of other children. The container also has a surface in the front of the container for a child's name, address, and an emergency telephone number. Thus, the day care center has an easier task in getting the correct bottle and jar to each child.

The container not only has compartment inside the basket-like configuration but also has been designed to accommodate accessory componentry such as reusable plastic containers of a smaller size that can be clipped onto the outer side walls of the basket-like carrying container. These smaller containers are for the purpose of carrying dried foods such as cereals, raisins, etc. and/or juice boxes that can be clipped on the side of the basket-like container thus allowing dried foods, liquids and pureed foods all to be carried by one contained unit.

Disclosures in this general field of activity are found in the following U.S. Pat. Nos.:

3,349,958 1,990,675
4,538,727 1,520,444
4,067,474 3,341,053
3,910,472 3,842,976
3,219,233

SUMMARY OF THE INVENTION

The present invention is directed to a reusable, self-contained, multiple-cavity carrying container for transporting a number of baby bottles (nursers), juice cups, and/or jars of baby food from one location to another. The container has a basic basket-like shape with an adjustable, removable handle for ease in carrying the container. The container at each cavity or chamber thereof has a cylindrical clamp-like holder with a diameter approximately the size of the smallest diameter of the conventional baby bottle currently on the market.

The clamp-like holder is yieldable and has an open space that vertically extends throughout the height of the container. This allows the holder to expand and contract to accommodate bottles of different sizes. The holder grips the bottle and/or juice cup or baby food jars by self-adjusting to the diameter of the bottle, cup or jar placed in the holder. Then, with friction lightly gripping the sides of the bottle or jar, the holder keeps the bottle or jar from falling out of the holder if the container were to tip over on its side. However, with a small pulling force, the bottle or jar will be easily removed from the holder.

The primary object of the present invention is to provide a carrying container for baby feeding products wherein the container has structure which releasably holds bottles, cups and baby food jars in place in the container even though the container has an open top which permits viewing of the contents of the container and easy access to such contents.

Another object of the present invention is to provide a container of the type described wherein the holders of the container can be provided for bottles, juice cups and baby food jars of different dimensions so that the container is universally adapted for substantially all conventional baby feeding bottles and baby food jars.

The container may also have accessories clipped on its side, the accessories being: juice box holders, and containers for holding cereals and/or dried foods used for children. These accessories containers have flip tops workable on a living hinge and hooks or slips on the backs which slide over the carrying container for a secure hold. They can also be easily removed from the carrying container to give to the child during feeding.

BRIEF DESCRIPTION OF THE DRAWINGS

FIGS. 9 and 9A are perspective and side elevational views, respectively, of the carrier unit showing a cereal/dry goods container clipped onto one side of the carrier unit;

FIG. 10 is a perspective view of the small container separated from the carrier unit;

FIG. 11 is a perspective view of a handle for the carrier, the handle being adjustable vertically so that the effective length in a vertical plane can be adjusted so that handle can have a relatively low position or a relatively high position;

FIG. 12 is a view similar to FIG. 11 but showing the low position of the handle with respect to the carrier; and FIG. 13 is a schematic view of the handle and the way in which the handle is releasably held in position.

DESCRIPTION OF THE PREFERRED EMBODIMENTS

Figure 1:
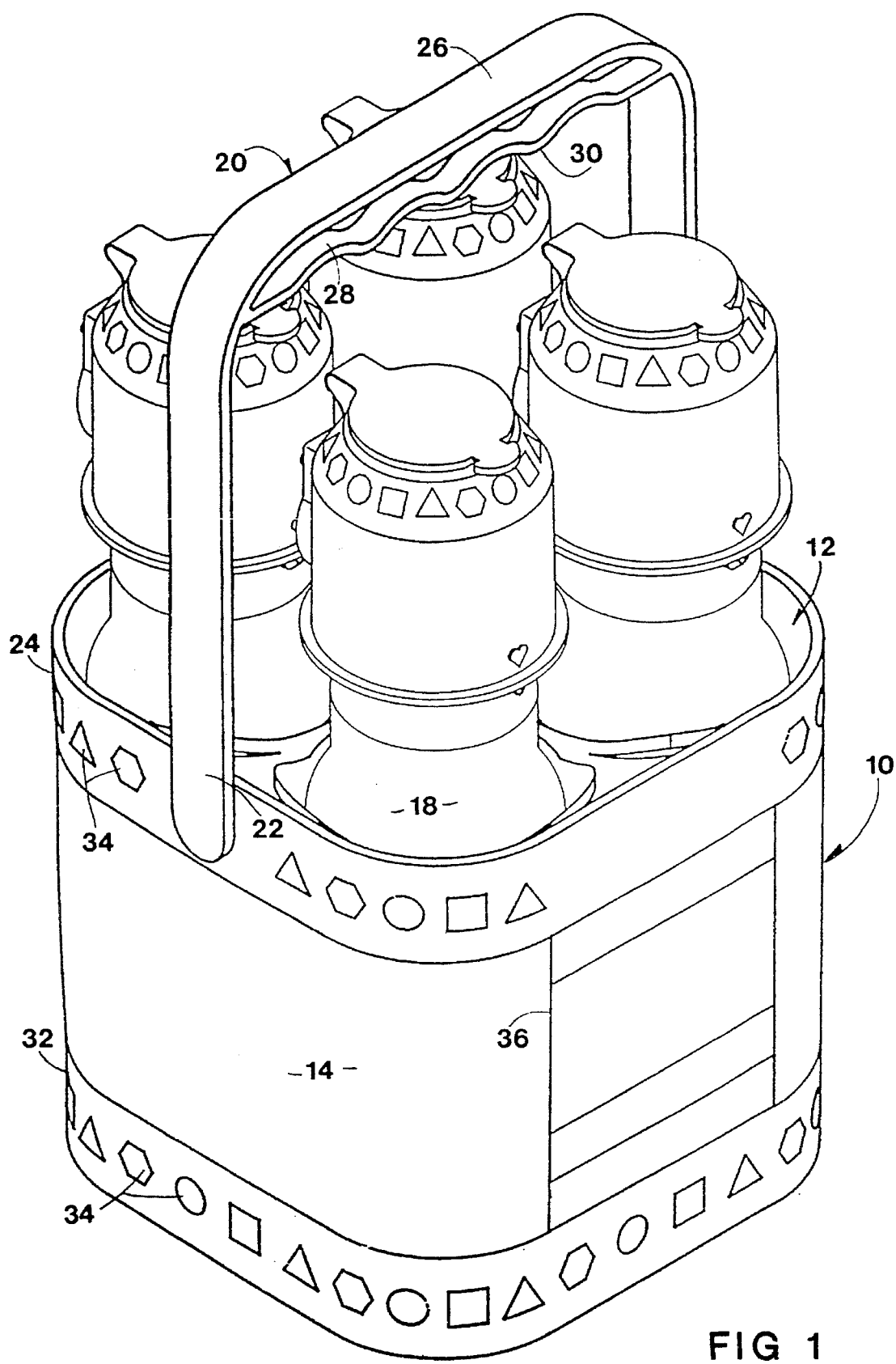
FIG. 1 is a perspective view of a container or carrier unit for baby bottles, baby food jars and the like, four such bottles being shown in the carrier unit.
Figure 2:
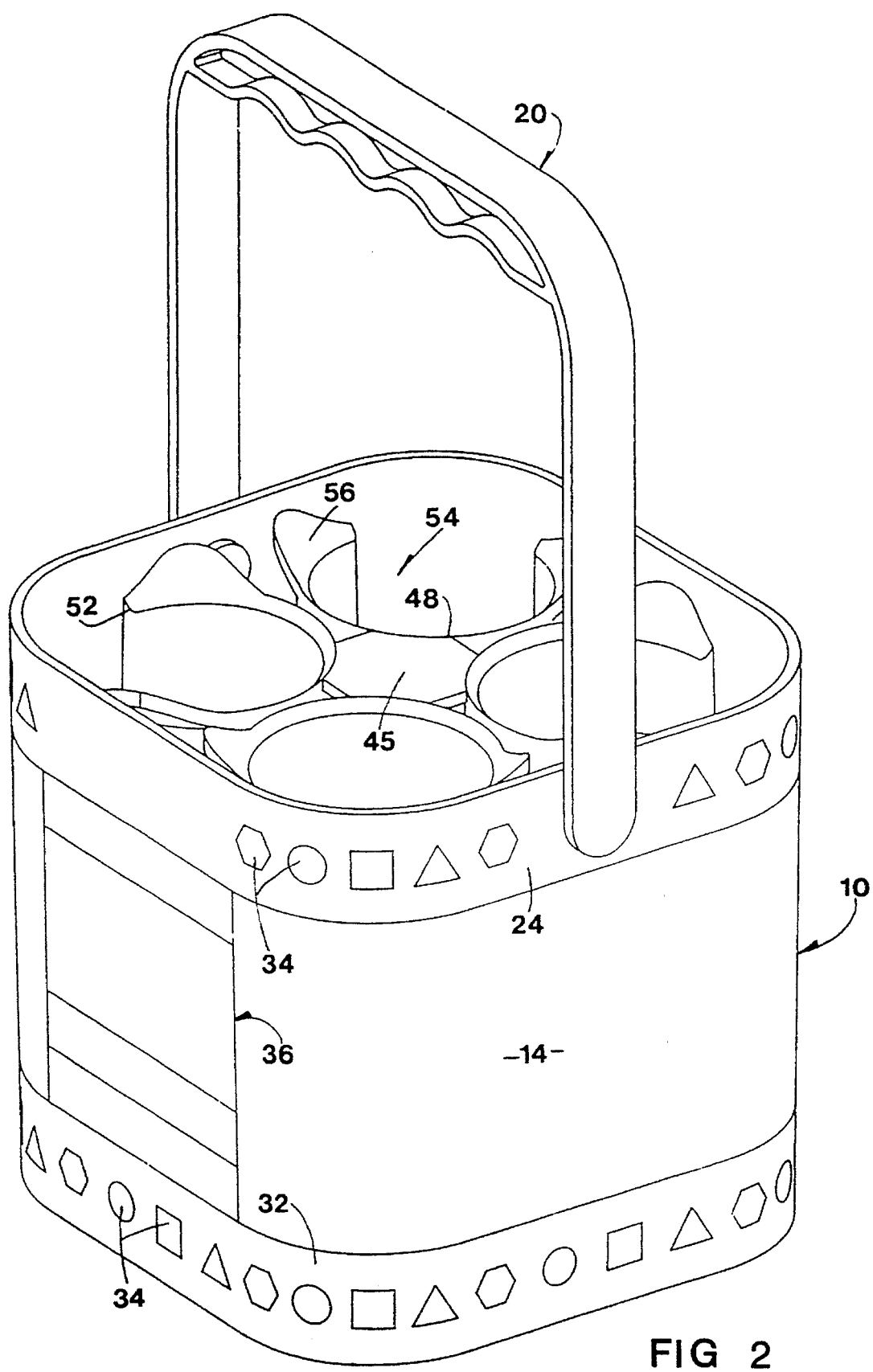
FIG. 2 is a view similar to FIG. 1 but showing the carrier unit without the baby bottles of FIG. 1.
Figure 3:
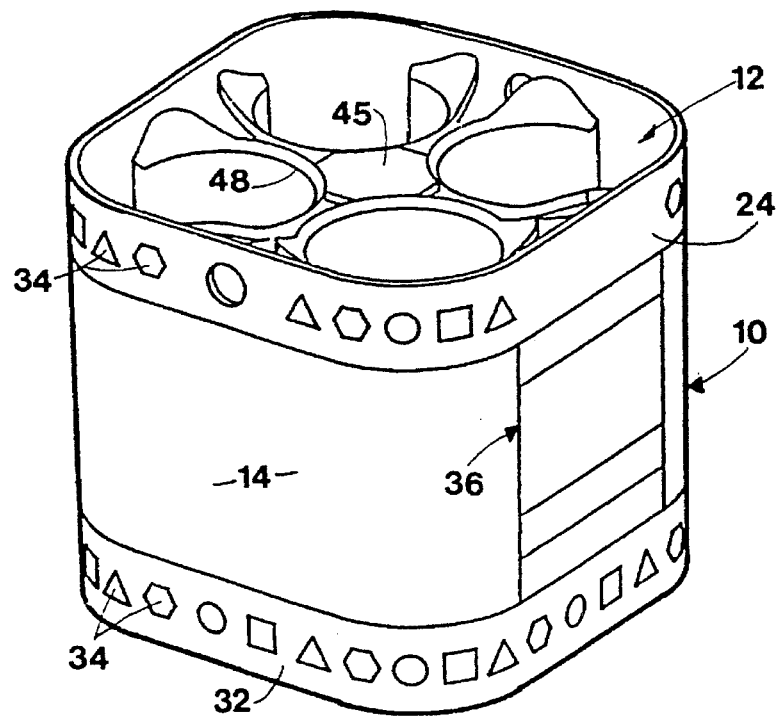
FIG. 3 is a view similar to FIG. 2 but showing the handle of the carrier unit removed therefrom.
Figure 4:
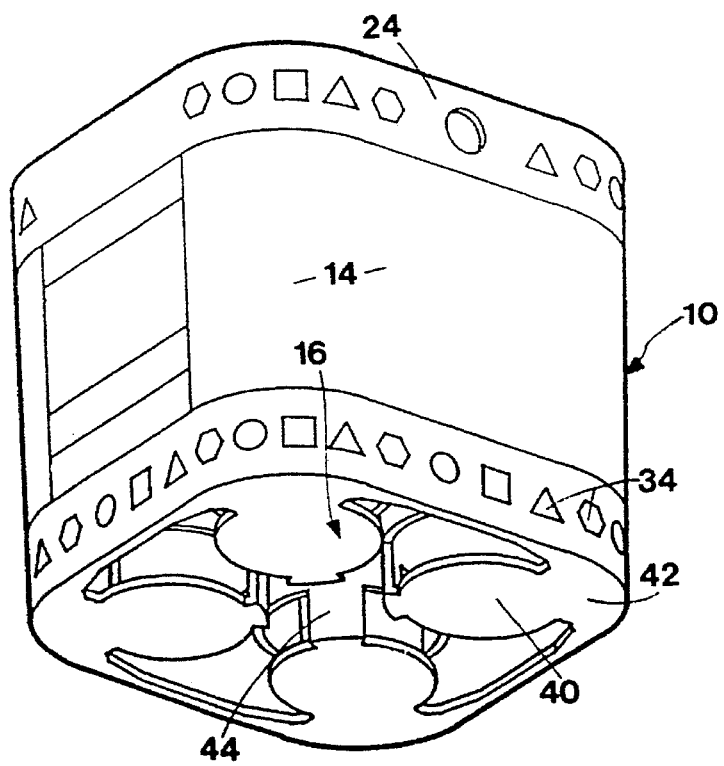
FIG. 4 is a view similar to FIG. 3 but showing the bottom view of the carrier unit.

The carrier unit or container for baby bottles, baby food jars and other baby feeding products is broadly denoted by the numeral 10 and is shown in FIGS. 1–4. Carrier unit 10 is basket-like in configuration and has an open top 12, an outer sidewall 14 which extends around the outer periphery of the carrier unit, and a bottom 16 (FIG. 4) for supporting a number of baby bottles 18 or baby food jars in the carrier unit. An inverted U-shaped handle 20 has lower ends 22 which are releasably and swingably coupled to the upper, outer margin 24 of carrier unit 10. The crosspiece 26 of the handle 20 overlies a lower member 28 having an undulating lower surface 30 to facilitate carrying the carrier unit 10 in the hand.

For purposes of illustration, carrier unit 10 is square in configuration. It is dimensioned to present four cavities and thereby to hold four baby bottles 18 as shown in FIG. 1. However, the carrier unit can be of any other suitable configuration, if desired, and can accommodate a fewer or a greater number of baby bottles 18 or baby food jars and the like. For instance, a bottle 18 could be removed from a cavity in the container and replaced by a pair of vertically stacked baby food jars (not shown).

Figure 8:
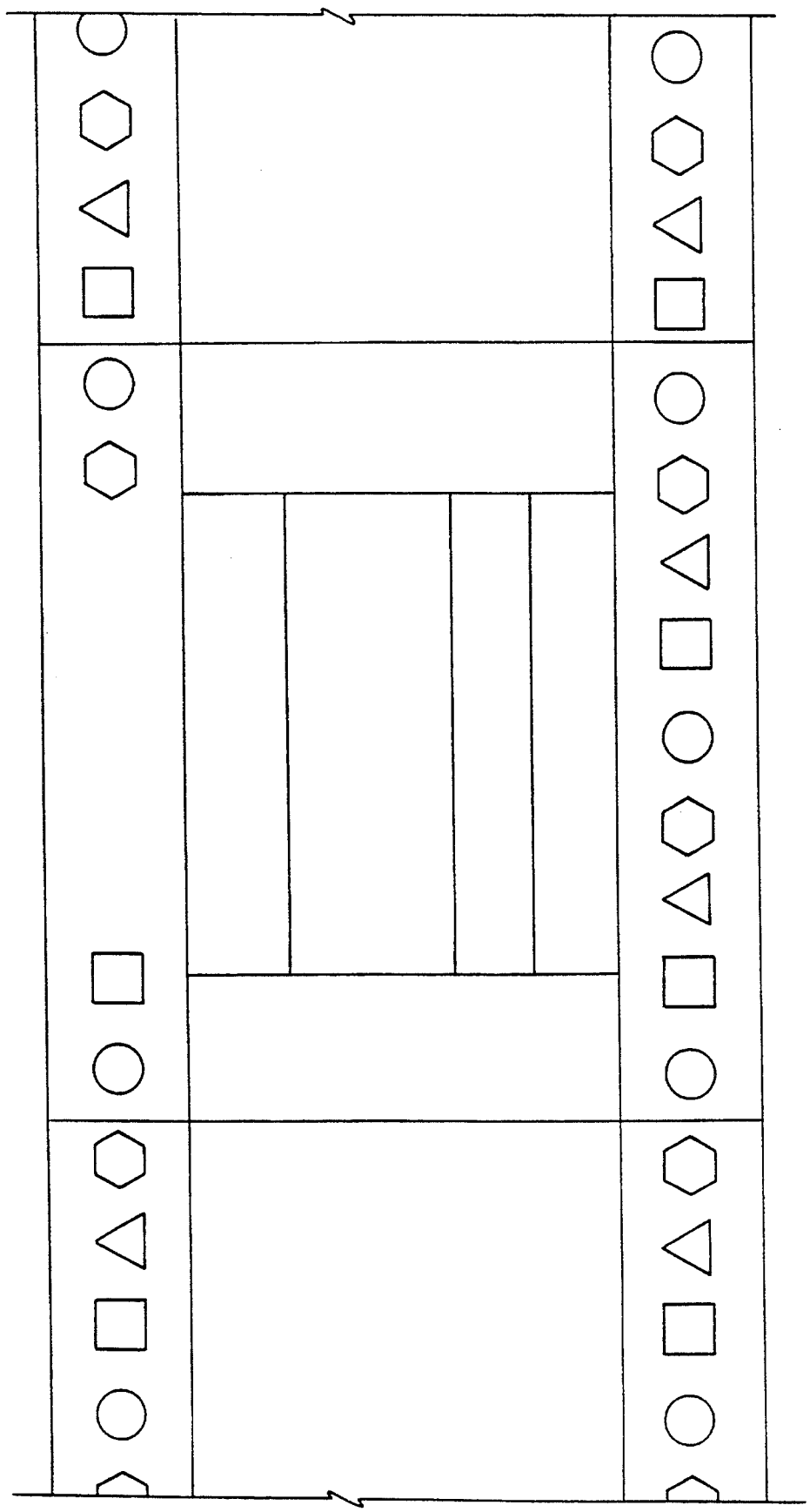
FIG. 8 is a side elevational view of the carrier unit when the sidewall thereof is flattened to illustrate a name and address label and graphic symbols for aesthetic purposes on the outer surface of the carrier unit.

Preferably, carrier unit 10, except for handle 20, is of a one piece construction molded from a suitable plastic material, whereby the sidewall 14, the bottom 16 and interior parts of the carrying unit (to be described hereinafter) are all formed in a single molding process. Moreover, the outer, upper margin 24 and the outer, lower margin 32 of carrier unit 10 is provided with graphic symbols 34 of various designs to provide an attractive exterior surface for the carrier unit. Moreover, an address label 36 can be molded or attached to the side of the carrier unit, and a felt pen or the like can be used to write the name, address and certain phone numbers on the label 36. While the graphic symbols 34 are shown as being polygonal and circular in configuration, they can be of any other suitable size or shape, if desired. FIG. 8 shows the graphic symbols as they would appear if the outer sidewall 14 of carrier unit 10 were to be flattened.

Bottom 16 (FIG. 4) has a number of disk shaped pads 40 which are secured by respective webs 42 secured to or integral with the adjacent inner surface of the sidewall 14. Webs 42 are at the corners of the sidewall near the lower margin 32 of the sidewall. The pads 40 extend into the center of the bottom opening of sidewall 14.

Figure 5:
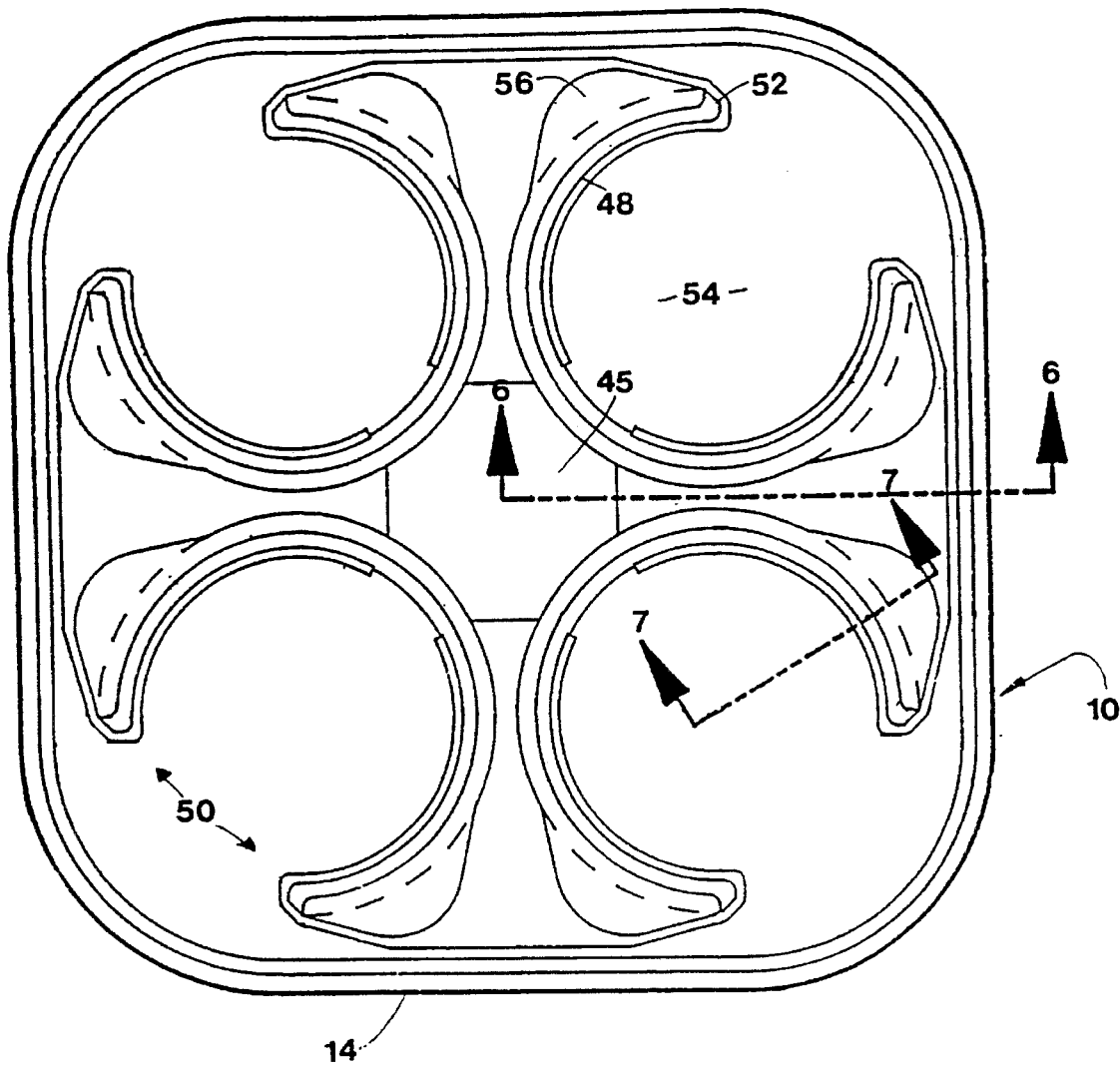
FIG. 5 is a top plan view of the carrier unit without the bottles therein.
Figure 6:
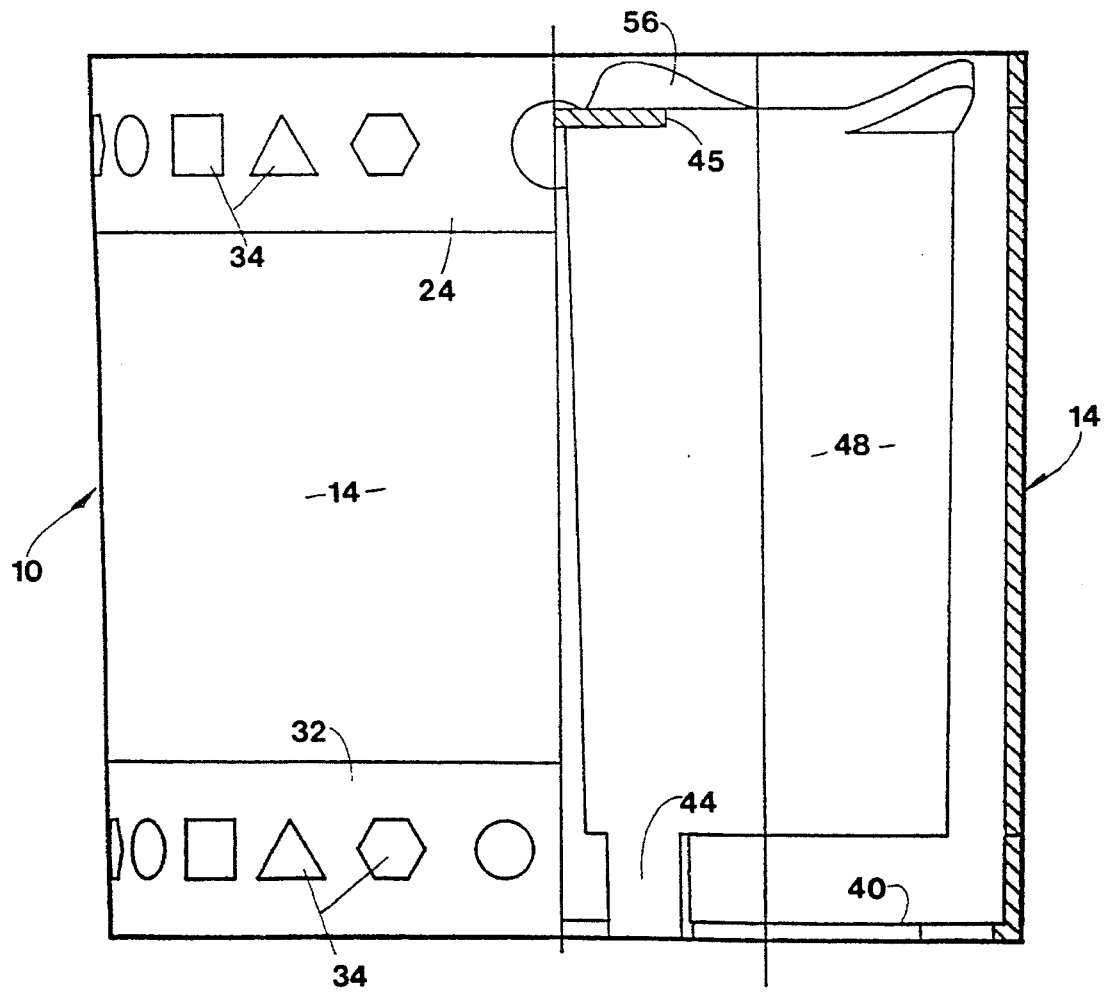
FIG. 6 is a cross-sectional view taken along the lines 6—6 of FIG. 5.

Webs 42 are preferably molded with sidewall 14 and each pad 40 has a vertical link 44 which extends upwardly from the pad and is coupled with a respective, transversely C-shaped inner wall member or holder 48 which has a side slit or opening 50 defined by spaced ends 52 (FIG. 5). Each link 44 is the only connection between the respective inner wall member 48 and its respective pad 40. However, an upper pad 45 (FIG. 2) can be used for stabilizing the upper ends of member 48. Thus, the curved wall parts 53 (FIG. 5) of inner wall member 48 on either side of the corresponding link 44 can flex or yield radially outwardly when a bottle is pushed into space 54 partially surrounded by inner wall member 48.

Figure 7:
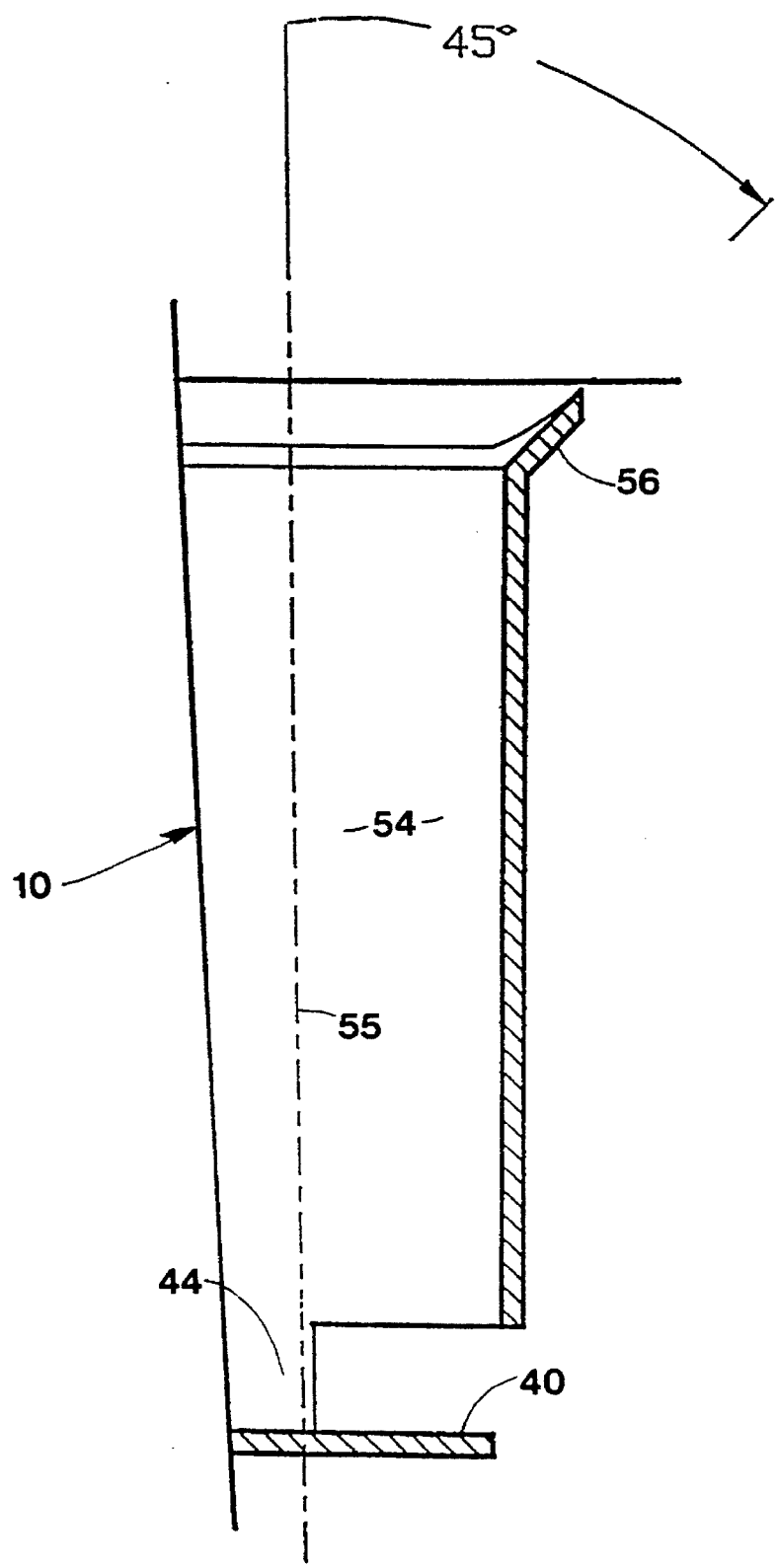
FIG. 7 is a cross-sectional view taken along line 7—7 of FIG. 5.

A pair of inclined flanges 56 are adjacent to the ends 52 of inner wall member 48. The purpose of the inclined flanges 56 is to assist in guiding the bottom of a baby bottle into the center portion of space 54 so that the sidewall surface of the baby bottle can engage the curved inner surfaces 53 (FIG. 5) and force the bottle into a position where it engages the bottom pad 40 and juts upwardly and outwardly from the open top 12 (FIG. 1) of carrier unit 10 along central axis 55 (FIG. 7).

When a bottle 18 is in a respective cavity or space 54 partially surrounded by inner member 48, the curved parts 53 of the respective inner wall member 48 will be biased toward the bottle 18 in a grip-like fashion. Therefore, the bottle will be gripped because of the resilience of the inner wall member 48 and because the space 54 is slightly undersized with reference to a baby bottle of average dimensions. The benefits derived from this type of construction are that baby bottles of slightly differing dimensions can be accommodated with the carrier unit of the present invention. Moreover, the pads 40, webs 42, links 44 and inner wall members 48 can all be of one piece construction and can be integral with the sidewall 14, if desired or deemed practical. FIG. 7 shows sidewall 48 tapering to a minimum dimension as the lower end thereof is approached, the link 44 being shown as connecting the tapered inner sidewall member 48 with the pad 40 therebeneath.

In use, four baby bottles 18 (FIG. 1) are inserted into respective cavities or spaces 54 (FIG. 5). The bottles will engage and force the sidewalls 48 to expand and the inner surface of each wall 48 will frictionally engage in a clamping fashion the outer surface of the bottle in the corresponding space 54. Thus, even if the carrier unit were to tip over, the bottles 18 would remain in the positions thereof shown in FIG. 1. Jars of baby food and/or juice cups could replace a bottle 18, if desired. Label 36 (FIG. 1) will be provided with a place for name, address, and phone numbers needed to associate the carrier unit with a specific baby.

Figure 9A:
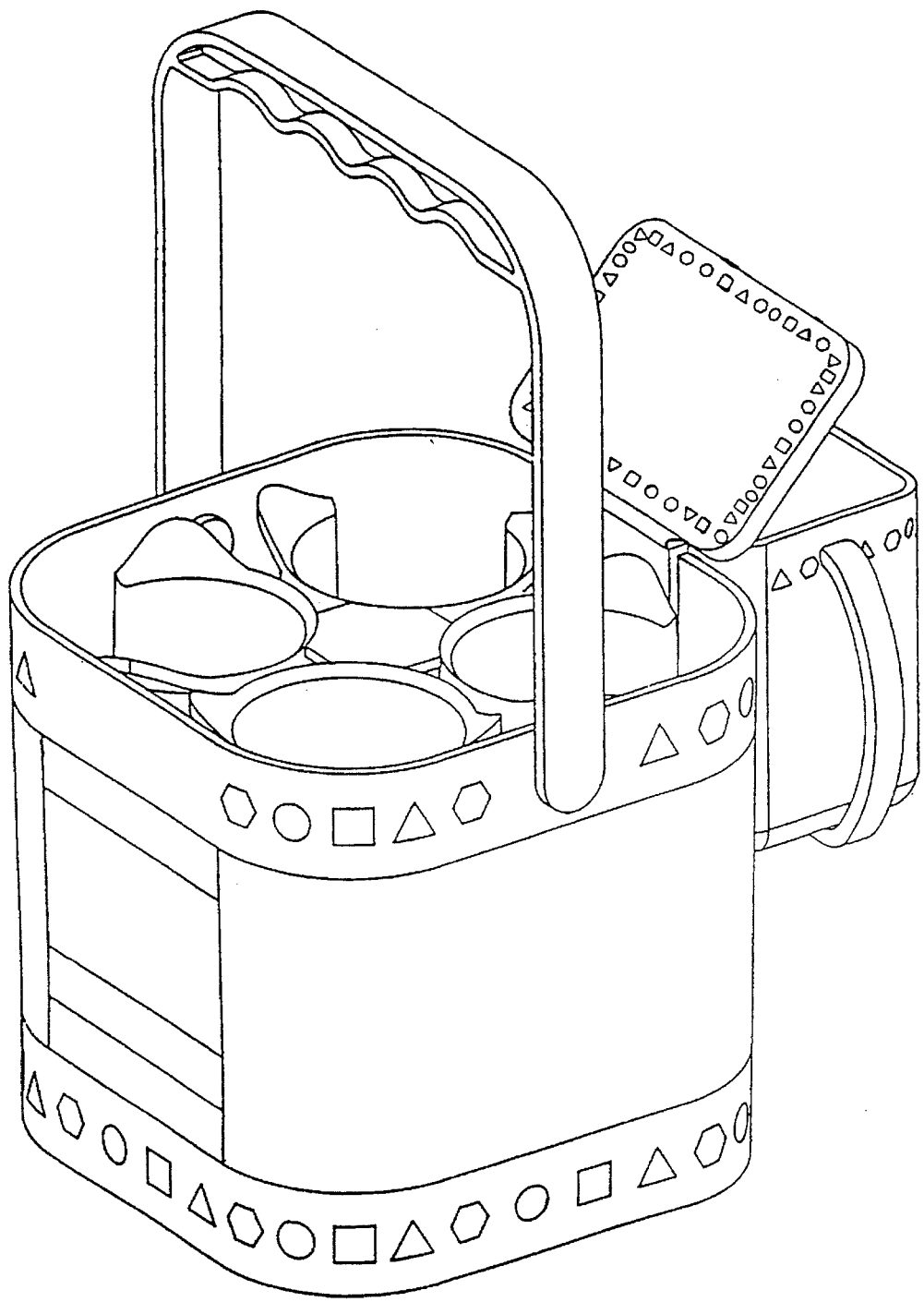

A small container 70 can be used with carrier unit 10 in the manner shown in FIGS. 9 and 9A. To this end, container 70 has an open top 72 which is closed by a lid 74 coupled by a living hinge 76 to one side 78 of small container 70. One or more handles 80 can be provided to hold the container when it is separated from the carrier unit.

Clip 82 is provided to lap over side wall portion 78 as shown in FIGS. 9 and 9A so as to couple the container 70 to carrier unit 10. Lid 74 has a suitable hasp 86 on lid 74, hasps 86 being engageable with a projection 88 on the front wall portion 90 of container 70. When the hasp engages the projection, the lid is releasably closed. Lifting up on lid 74 separates it, opening the container.

The upper margin of the container and the top surface of the lid may be provided with artistic symbols to provide an aesthetic effect for the small container.

An improvement for carrier unit 10 is shown in FIGS. 11, 12 and 13. To this end, an adjustable handle 92 can be used with carrier unit 10, if desired. Handle 92 has a pair of lower sides 91 which can be moved into a lower position (FIG. 12) or the handle can be moved into an upper position (FIG. 11). The reason the lower position is used to allow the handle to be retracted for stacking of the carrier unit 10 with other carrier units. The elevated position of the handle as shown in FIG. 11 allows the hand and fingers to grasp the cross piece of the handle more easily. The lower position would place the cross piece of the handle much closer to the upper ends of the clamps and would interfere with the grasping of the handle in carrying the carrier unit 10 from place to place. The sidewall of carrier unit 10 has a pair of sides 33 and 35, each side having an upright slit or channel 37, only one of which is shown in FIG. 11. Each lower part of handle 92 is denoted by the numeral 91 and the handle has a pin or shaft 104 (FIG. 13) secured to a respective lower handle part 91. The pin 104 extends through the corresponding channel 37 and the end of each channel 37 is circular as shown in FIGS. 11 and 12 so that pin 104 will engage the edges defining the upper and lower portions of the channel. Thus, the handle is frictionally and thereby releasably engageable with the carrier unit 10. A bolt or cap 106 is press fitted or forced onto the inner end of the pin 104 and this retains the handle in place as shown in FIGS. 11-13.

When the handle 92 is at its highest position, the lower end of the handle will be near the upper circular end of channel 37. In this position, the handle can be grasped and the carrier unit 10 lifted and carried from place to place. With the handle in its storage position as shown in FIG. 12, the cross piece of the handle will be closest to the cylindrical vessels which are carried in the carrier unit 10 and the carrier unit 10 can then be easily stacked with other such units 10 in a box or the like. The movement of the handles downwardly and upwardly is achieved by virtue of the fact that the pins 104 pass through channel 37. The side edges defining the channels frictionally engage the pins 104 and the bolt 106 is press fitted on the respective pins 104 to hold the pins in the channels. This makes for a simple and rugged connection between the handle and the carrier unit 10 while allowing some limited movement of the pin through the channels 37 as the lower ends of the channels move from the upper positions shown in FIG. 11 to a lower position shown in FIG. 12.

What is claimed is:

1. A carrier unit for one or more cylindrical vessels comprising:

an open top container having a bottom for supporting at least one of the cylindrical vessels;

an inner self-adjusting clamping system and an outer sidewall surrounding the clamping system, said clamping system including a number of transversely C-shaped clamps which function separately and independently of each other, said clamps being free of common vertical walls and each clamp is independently adapted for releasably holding the cylindrical vessels therein by self-adjustment about each cylindrical vessel with sufficient clamping action to prevent the cylindrical vessel from falling out of the open top container when the open top container is tipped upside down; and means for hand carrying the container.

2. A carrier unit as set forth in claim 1, wherein each of said clamps includes an inner tubular side wall within the container, said inner side walls being yieldable to grip respective cylindrical vessels of various sizes.

3. A carrier unit as set forth in claim 1, wherein said inner clamping system includes a clamping member having a transversely C-shaped configuration, each clamping member having a central space and a generally upright channel opening allowing for independent flexible movement of each clamping member, said C-shaped configuration of the clamping member at least partially surrounding the space, said clamping member having a region for receiving a cylindrical vessel when the latter is inserted into the clamping member and engageable with the adjacent inner surface portions of the clamping member.

4. A carrier unit as set forth in claim 1, wherein each clamp has a lower end coupled with a bottom and independent of all adjacent clamps, and an upper end coupled with the top of all other clamps and independent of the outer side walls, said clamp being adjacent to the open top of the container.

5. A carrier unit as set forth in claim 4, wherein said clamp has a narrow channel defining an opening extending longitudinally of the full clamp to provide a transversely C-shaped configuration for the clamp.

6. A carrier unit as set forth in claim 4, wherein each clamp has a link coupling the clamp with the bottom of the container, each clamp remains independent and free of linkage to the other clamps at the bottom of the container.

7. A carrier unit as set forth in claim 1, wherein said bottom includes a number of spaced pads, and web means coupling the pads to the lower margin of the outer sidewall.

8. A carrier unit as set forth in claim 7, wherein the bottom includes a pad for each cylindrical container, respectively.

9. A carrier unit as set forth in claim 1, wherein said clamping system includes a clamp comprising of a tubular inner wall member spaced apart from the outer side wall of the open top container.

10. A carrier unit as set forth in claim 1, wherein said clamping system includes an inner wall clamp member having a central axis and secured to and extending upwardly from the bottom, each clamp member having a pair of resilient wall segments movable outwardly of the central axis for the purpose of receiving cylindrical vessels of various sizes, each of the wall segments being movable independently since it is free of walls common to the other clamps and outer sidewalls.

11. A carrier unit as set forth in claim 10, wherein each central axis is generally upright.

12. A carrier unit as set forth in claim 10, wherein each clamp has a pair of upper end flanges thereon, said flanges being inclined to facilitate the insertion of cylindrical vessels of different sizes, including vessels larger than the natural opening of each clamp.

13. A carrier unit as set forth in claim 10, wherein said bottom has a plurality of spaced pads and a group of holes therethrough, there being guide webs for coupling the bottom pads to the lower margin of the outer sidewall.

14. A carrier unit for holding a number of cylindrical vessels comprising:

a container having an open top, a bottom, an outer sidewall there being an inner clamping system in the container, said outer sidewall extending about the container that shares no inner sidewalls within the inner clamping system and is only connected to the inner clamping system at the bottom of the container allowing for an independent outer wall defining a first space;

means in the first space for mounting a clamping system in generally upright positions, said clamping system including a number of inner sidewall members, each inner sidewall member being tubular and having link means for coupling the same to said bottom, each inner side wall member having a transversely C-shaped clamp with an open top second space therewithin for receiving and firmly holding a cylindrical vessel to be supported in the open top container, all clamps are back to back and are linked together at the top by a generally horizontal connector piece, and are not connected to each other at any other location and remain free of any vertical sidewall in common with the outer sidewall; and means for hand carrying the container including a handle.

15. A carrier unit as set forth in claim 14, wherein the handle can be swingable or can be stationary, said handle being connected to the outer sidewall of the container by a pair of pins on the inside of said handle being received through a pair of holes on the side of said container, said pins then being received through a lug, said lug prevents said pin from popping out of hole in container.

16. A carrier unit as set forth in claim 14, wherein the handle has a pair of sides, there being a pin on the lower inside wall of each side respectively, said pins being received into an opening on opposite sides of the container, respectively, there being cylindrical holes at the top and bottom of said opening with an open channel between them on each side of the open top container, and means for coupling the pins on the inner side walls of the handle through the holes in the outer side walls of the container, there being a lug on the inside wall of the container to receive the pins as they come through the holes on said container, said pin is received in said lug by a friction fit and then will be glued for a permanent fit, said pin and lug hold said handle on said container.

17. A carrier unit as set forth in claim 14, wherein two opposing of the outer side walls of the container have openings, said openings consist of two cylindrical holes, one near the top of the container and one near the bottom of the container, said cylindrical holes are open to a connecting open channel there between said holes, and including a pin and lug connect through said cylindrical holes and can travel from the upper holes through the open channel to the lower set of holes with light pressure being applied to the handle in a downward motion, said handle can also move from the lower set of holes back to the upper set of holes through the channel by again applying light pressure to the handle with an upward pull on the handle so the pin will snap out of the lower hole, travel through the channels and snap into the upper holes, this allows the handle to be high enough to fit over tall cylindrical vessels in the container and to snap down to a shorter height for storage and shipping.

18. A carrier unit as set forth in claim 14, wherein the container has a pair of opposing side walls, each side wall having a generally upright channel therethrough, the channel on one side being aligned with the channel on the other side, there being means on the handle sides for adjustably mounting the vertical sides on the container whereby the handle can be carried in an upper position or in the lower position depending upon the position of the handle relative to the sides of the container.

19. A carrier unit as set forth in claim 14, wherein the container has a pair of opposing side walls, with each side wall having a vertical channel, there being circular holes at the upper and lower ends of the channels, respectively, and including a pin and lug connecting through the cylindrical holes to travel between the holes.

20. A carrier unit as set forth in claim 14, wherein said individual clamps include an outer tubular sidewall within the outer wall of the container, said outer sidewalls are independent of one another and are free of common walls with each other.

* * * * *